US008675028B2

(12) United States Patent
Mowry et al.

(10) Patent No.: US 8,675,028 B2
(45) Date of Patent: Mar. 18, 2014

(54) DISPLAY SYSTEM AND DEVICE WITH SUSTAINABLE POWER GENERATION

(76) Inventors: Craig P. Mowry, Southampton, NY (US); Jesper Kofoed Thomsen, Espergærde (DK)

( * ) Notice: Subject to any disclaimer, the term of this patent is extended or adjusted under 35 U.S.C. 154(b) by 200 days.

(21) Appl. No.: 13/089,949

(22) Filed: Apr. 19, 2011

(65) Prior Publication Data

US 2011/0254877 A1    Oct. 20, 2011

Related U.S. Application Data

(60) Provisional application No. 61/342,682, filed on Apr. 19, 2010, provisional application No. 61/413,191, filed on Nov. 12, 2010, provisional application No. 61/420,165, filed on Dec. 6, 2010, provisional application No. 61/453,822, filed on Mar. 17, 2011.

(51) Int. Cl.
*G09G 5/10* (2006.01)
*G06F 3/038* (2013.01)
*G09G 5/00* (2006.01)

(52) U.S. Cl.
USPC ............ 345/690; 345/206; 345/211; 345/619

(58) Field of Classification Search
USPC ........................................................ 345/211
See application file for complete search history.

(56) References Cited

U.S. PATENT DOCUMENTS

| 5,933,812 | A | * | 8/1999 | Meyer et al. .................... 705/15 |
| 6,396,985 | B2 | | 5/2002 | Lowry et al. |
| 2002/0022499 | A1 | | 2/2002 | Newman et al. |
| 2002/0126136 | A1 | * | 9/2002 | Lin .............................. 345/619 |
| 2005/0040962 | A1 | * | 2/2005 | Funkhouser et al. ....... 340/815.4 |
| 2007/0242233 | A1 | | 10/2007 | Sokeila et al. |
| 2007/0273675 | A1 | * | 11/2007 | Wangler ....................... 345/204 |
| 2008/0266245 | A1 | | 10/2008 | Wilcox et al. |
| 2008/0284675 | A1 | * | 11/2008 | Perkins et al. ................. 345/1.3 |
| 2010/0056223 | A1 | | 3/2010 | Choi et al. |
| 2010/0238148 | A1 | * | 9/2010 | Sah ............................... 345/206 |
| 2010/0295861 | A1 | * | 11/2010 | Somerville et al. ........... 345/545 |
| 2011/0109607 | A1 | * | 5/2011 | Wu et al. ....................... 345/211 |

* cited by examiner

*Primary Examiner* — Charles V Hicks
(74) *Attorney, Agent, or Firm* — Leason Ellis LLP

(57) ABSTRACT

A display system and device includes energy generating elements operable to generate and store energy sufficient power the display device. The display device or devices are formed on flexible and preferable translucent sheaths to allow for mounting of the devices on virtually any surface. A control device is connected to several devices to provide instructions to operate light emitting elements in the devices to provide a desired image.

19 Claims, 5 Drawing Sheets

DISPLAY SYSTEM AND DEVICE WITH SUSTAINABLE POWER GENERATION

CROSS-REFERENCE TO RELATED APPLICATIONS

The present application claims benefit of and priority to U.S. Provisional Patent Application Ser. No. 61/342,682 filed Apr. 19, 2010 entitled OLED DISPLAY PANEL SYSTEM, U.S. Provisional Patent Application Ser. No. 61/413,191 filed Nov. 12, 2010 entitled GREEN DISPLAY NETWORK, U.S. Provisional Patent Application Ser. No. 61/420,165 filed Dec. 8, 2010 entitled ENERGY HARVESTING SYSTEM AND FACADES and U.S. Provisional Patent Application Ser. No. 61/453,822 filed Mar. 15, 2011 entitled AN ADDRESSABLE, ENERGY GENERATING DISPLAY SYSTEM, METHOD AND APPARATUS, the entire content of each of which is hereby incorporate by reference herein.

BACKGROUND

1. Field of the Disclosure

The present disclosure relates to a display system and device that generates energy to support its operation. The system and device preferably use sustainable power generating techniques to power operation of the display for a period of time.

2. Related Art

Urban areas are typically crowded with buildings and other structures. In view of the large populations in cities, they are a focal point for advertisers and are often crowded with billboards and video displays for presenting advertising information. Indeed, in many cities advertising, information is even provided on taxicabs, buses, phone booths etc.

By necessity, many cities and urban areas have imposed zoning and other regulations to somewhat limit advertising in an attempt to maintain some sense of aesthetic control. As a result, in most cases, the sides of buildings are typically not available for advertising, particularly high-rise type buildings. Further, building owners are likely to limit advertising as well, since advertising would likely obstruct views from the building, and thus, upset tenants.

Further, the large population of cities generally results in enormous energy consumption. Advertising displays on buildings or elsewhere only increases this energy consumption, which is another reason why city officials might limit advertising.

There are certain architectural designs that provide for display and energy generation, typically as parts of buildings, requiring great expense and at least a degree of permanence in the installation of an energy generating "display grid". A benefit of a permanent, constructed grid includes the potential of desirable, hard wired energy generation for use both within the display aspect of the installation/device and/or other energy needs. These other needs may include the building and/or external energy use relative to the structure supporting such a civic energy grid(s). These options, however, must be installed when the building is constructed, and thus, are not applicable to existing buildings. Further, there is little flexibility in these options as they must be incorporated into a specific building and are not usable in other areas.

Accordingly, it would be beneficial to provide a display system and or device that avoids these and other problems.

SUMMARY

It is an object of the present disclosure to provide a display system and device, suitable for mounting on a side of a building and including a sustainable power generating element that provides sufficient electricity to power the display device.

It is a further object of the present disclosure to provide a display system including a display device, or devices, that are mountable on a variety of surfaces and operate either independently, or together, to display a desired image.

A display device according to an embodiment of the present disclosure includes a flexible substrate, a light emitting element supported by at least the substrate and operable to selectively emit light, a communication device supported on the substrate and operable to receive instruction data related to an aspect of light output of the light emitting element and further related to a desired image to be displayed on the display device and a power device provided on the substrate and operable to generate electricity connected to at least the light emitting element, wherein the power device provides electricity to at least in part power the light emitting element to display at least an aspect of the desired image on the display device.

A display system in accordance with an embodiment of the present application includes a display device, a control device positioned separate from the substrate and in communication with the communication device, the control device operable to provide the instruction data and a synching device positioned separate from the substrate and operable to provide at least synching information regarding an image displayed on the image device and to transmit the synching information to the control device, wherein the instruction information is based on the synching information. The display device includes at least one flexible substrate, a least one light emitting element supported by at least the substrate and operable to selectively emit light, a communication device supported by the substrate and operable to receive instruction data related to an aspect of light output of the light emitting element and further related to a desired image to be displayed on the display device and a power device provided on the substrate and operable to generate electricity provided to at least the light emitting element, wherein the power device provides electricity to power the light emitting element to display at least one aspect of the desired image on the display device.

Other features and advantages of the present invention will become apparent from the following description of the invention, which refers to the accompanying drawings.

BRIEF DESCRIPTIONS OF THE DRAWINGS

DETAILED DESCRIPTION OF THE EMBODIMENTS

Figure 1:
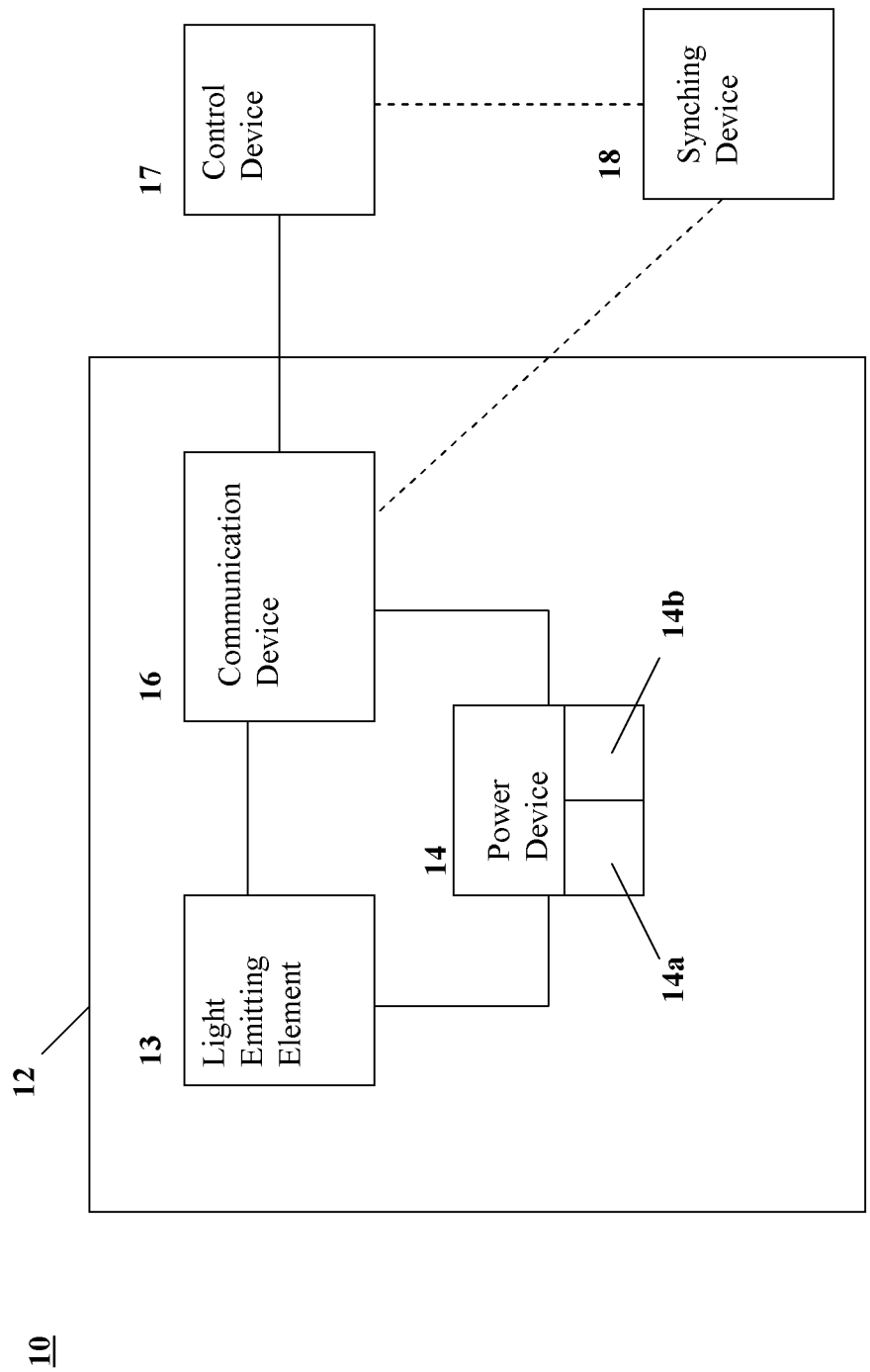
FIG. 1 is an exemplary block diagram of a display device in accordance with an embodiment of the present application.

In one embodiment, a network of display devices with tandem energy generating may be provided. This creates not only a unique display network or system, valued by advertisers and even usable for public address purposes, valued civically, for example, but also provides a new energy generating network. Such a network would presumably be allowed and encourages by private and public entities, as the revenue and energy generating potential of such a system would benefit both.

For example, the system and display of the present disclosure fulfill needs on a number of levels, through tandem design of display and energy generating operability.

Surfaces within cities, for example, would become available for displaying at least images, including paid advertising, where otherwise such spaces would not be zoned or permissible for such imaging. This, as the imaging aspects allowed may finance at least the construction of both the imaging devices and the related energy generating devices; in essence, a "green" advertising/display network.

As a computer operable business method, the green-display-network would encourage civic/government permissions for new advertising surfaces, potentially including the fronts of buildings, whether with or without windows. This, as the advertising entity controlling at least one aspect of revenue potential of such imaging devices would likely finance the construction of both visual and the energy generating components.

Further, private permissions for such new display devices might be facilitated by the energy offsetting that the linked energy generating operability provides. This alone, or in tandem with potential payments to the building owners, or other surface owners, makes revenue generating potential of such display surfaces that was not and would not be feasible absent the system and device of the present disclosure.

Further, the display devices preferably incorporate live updating of at least electronic (video) images as well as potential social networking and interactive operabilities, including those previous disclosed by related US patent applications, including those by the present inventor, including U.S. patent application Ser. No. 12/691,688 filed Oct. 28, 2010 entitled SYSTEM AND METHOD FOR PUBLIC DISPLAY OF INTERACTIVE USER SUBMITTED MEDIA, the entire content of which is hereby incorporated by reference herein.

Disclosed herein is an addressable, energy generating display system, method and device. In a preferred configuration, versatility and cost of assemblage and configuration of network addressability are among the aspects improved.

It is known that laws typically regulate the display of media in public areas, as is noted above. These constructs include zoning ordinances and other governmental boundaries imposed on civic management, often affecting the display of advertising images in public depending on the jurisdiction in question.

Herein, a display device 10, or devices, that is addressable, preferably in a computer operable network configured and/or affected for the purpose of the improving at least one aspect of civic efficiency, such as energy consumption/creation and/or civic programs for generating revenue to fund programs typically financed from taxes, for example. This is a "green" system or device, designed to save and/or generate enormous quantities of energy at least associated with the illumination of publicly displayed advertising visuals, especially at night.

Specific programming is further provided for operating this network, in at least one configuration. Herein, an example of this software includes at least one application that is operable on at least one PDA device type, with communications through at least one communications network providing implementation of instructions resulting from this application's use.

The civic benefits of the display device and system include a powerful incentive for revisions and/or creation of law to accommodate at least some duration of visual display, such as of advertising and/or public service announcements. This might be, for example, continual or for a prescribed period of time such as the night hours between 8 PM and midnight, for example, when a light generating display might be most visible and/or visible by an acceptable number of desired viewers. Further, the revenue potential of new advertising devices potentially in or visible from public spaces previously limited by civic rules, such as laws is realized. In essence, new advertising and public announcement "realty" is created, herein, by further providing solutions for costly energy issues associated with displaying media publicly, at least.

In an embodiment, illustrated in the exemplary block diagram of FIG. 1, a display device 10 includes one or more light emitting elements 13, one or more power (generating) devices 14, and at least one communication device 16 that receives instruction data or information to control operation of the light emitting devices 13. That is, instructions for operating the light emitting devices 13 are provided in the instruction data received by the communication device. The communication device 16 may include a processor or other processing element that is operable to process the instruction data and provide control signals to control the light emitting element 13. A control device 17 is provided, generally separate from the other components to provide the instruction data to form a desired image on the display device 10. The control device 17 is in communication with the communication device 16, either via a wired or wireless connection. The instruction data is preferably provided to operate the light emitting elements 13 to provide a desired visible image on the display device 10.

While a single light emitting element 13 is illustrated in FIG. 1, the device 10 may include multiple light emitting elements, if desired. These elements 13 may be controlled individually or as a group.

In an embodiment, several display devices 10, or groups of display elements, may be provided on a building or other surface. Each device 10 may operate independently or may operate in cooperation with other devices to provide a single desired image over the entire surface covered by the devices 10. The control device 17 is preferably in communication with all of the display devices 10 and provides appropriate instruction data to each such that the operation of all light emitting elements 13 provides the desired display image. Each of the devices 10, therefore is assigned a unique address, or other identifier, preferably based on its position relative to the control device 17 and the other surrounding devices, such that it receives unique instruction data related to a specific portion of the desired image.

In an embodiment, a synching device 18 is preferably provided and used to analyze the displayed image on the display device 10 (or devices) and provide synching information, preferably to the control device 17, to ensure that the desired image is displayed. That is, the synching device 18 gathers image information related to the image actually shown on the display device and compares it to information related to the desired image. The resultant synching information is the provided to the control device 17, which may use the synching information to adjust the instruction data, and thus, the operation of the light emitting elements 13 to provide the desired image. In an embodiment, the synching information may be provided directly the display devices 10 themselves via the communication devices 16 provided therein. In this case, each device 10 would be provided with a unique address based on its relative position from the synching device 18 and the other display devices.

Figure 2:
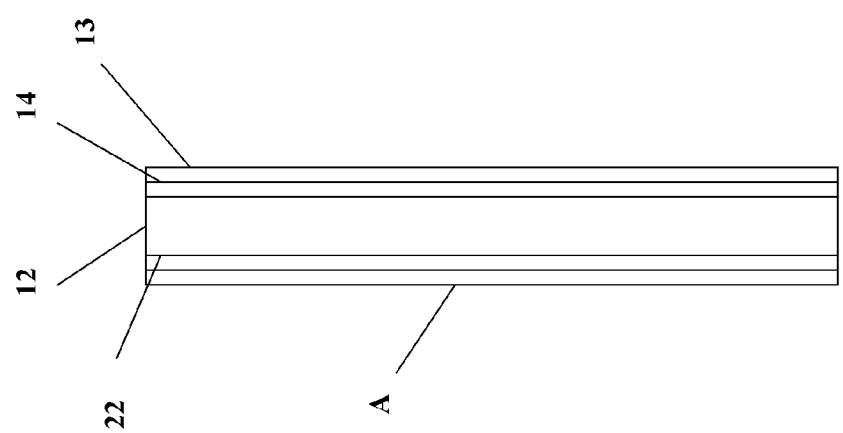
FIG. 2 is a cross sectional view of an embodiment of the display device embodied on a flexible sheath in accordance with an embodiment of the present application.

In a preferred embodiment, each display device 10 is embodied on a flexible and preferably transparent, or at least semi-transparent substrate or sheath 12 (see FIG. 2, for example). The light emitting elements 13, power device 14, preferably including power generation element 14a and power storage element 14b and the communication device 16 are all mounted or otherwise supported on the sheath 12. In addition, these components are embodied as substantially flat and flexible material that are preferably at least semi-transparent. While FIG. 2 illustrates an exemplary embodiment in which the power device 14 and filter element 22 are directly mounted on the substrate 12, any order may be used, however, it is the substrate 12 that ultimately supports all elements even if not directly in contact therewith.

Figure 3:
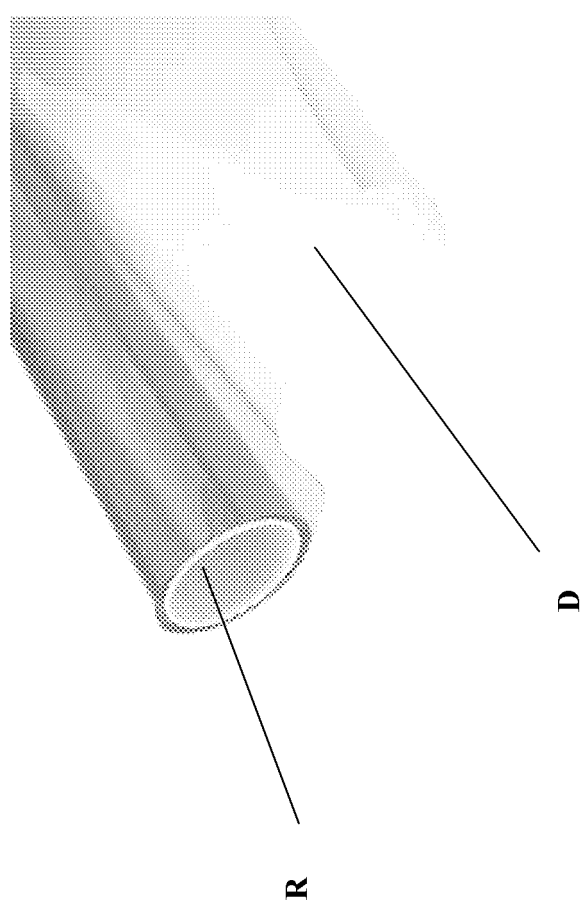
FIG. 3 is an exemplary illustration of a display device embodiment in a flexible sheath that is stored on a roll in accordance with an embodiment of the present application.
Figure 4:
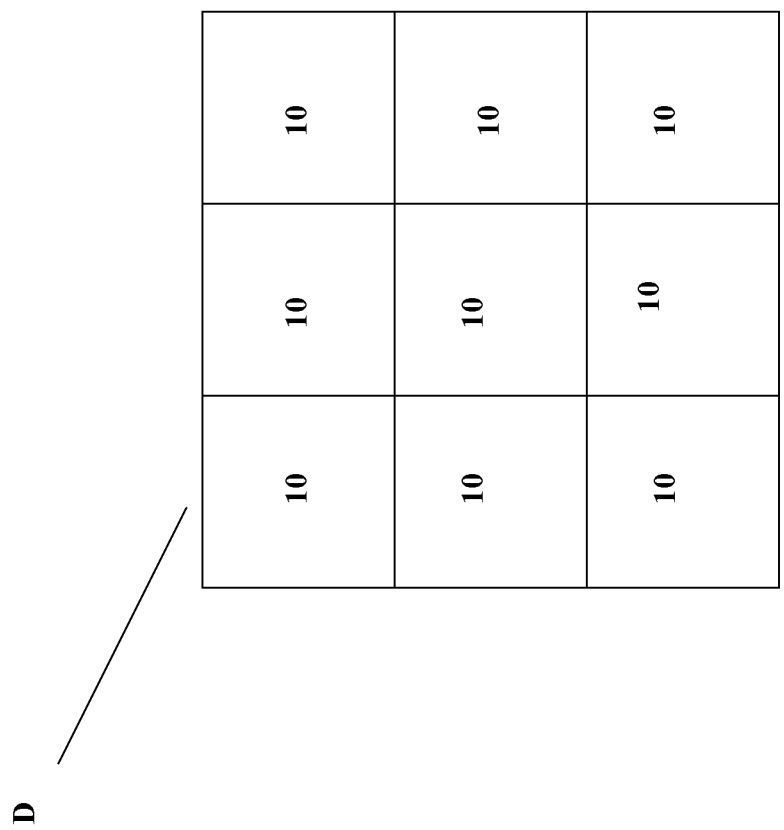
FIG. 4 is an illustration of a display sheath including several display devices in accordance with an embodiment of the present application.

The substrate, or sheath 12, is preferably transparent and/or semi transparent and flexible. The sheath 12 may be made of a celluloid material, polyvinyl or any other suitable flexible and transparent or semi-transparent material. Thus, a network of display devices 10, hereinafter referred to as the "display sheath" D see FIG. 3, may be maintained on a roll or other efficient containment, if desired. FIG. 3 illustrates an example of such a display sheath D including several display devices stored on a roll R. For applications where visibility through the display sheath D is not necessary, this component may be opaque. The display sheath D may be as large or as small as desired by those configuring the display device for installation, for example on a window or other surface of a building or other structure. More about this opaque scenario will be disclosed in the following specification. FIG. 4 illustrates a display sheath D with several display devices 10 mounted thereon. Each of these display devices 10 may be controlled separately, or may be grouped together and controlled together as a group, as desired.

In addition, the sheath 12 and/or display sheath D may include an adhesive layer A (see FIG. 2) and/or other affixing element or aspect, for providing said display sheath to another object, such as a window or other surface and/or object capably of maintaining the sheath, or a portion thereof in a position that is manageable by system operability, as least in regards to a desired display and/or energy generating functions. While adhesive A is preferred, any suitable attachment element may be used including magnetic elements, for example.

The power device(s) 14 are preferably sustainable energy producing elements that use solar power, wind power, mechanical deformation or other sustainable means to provide electricity. For example, substantially transparent sheets of photovoltaic material are known which may be applied directly to the sheath 12 to provide the power device 14. In addition, or in the alternative, small and transparent micro photovoltaic cells may be used. Further, mini wind turbines are known which are small in size and provide electrical energy based on wind. In addition, piezoelectric materials are available that generate electricity based on deformation of the material. These materials may be substantially flat and transparent sheets and the deformation required to generate electricity may be the result of wind against the material or the compressive effect of ambient sound around the surface, for example. In any event, the power device 14 is preferably implemented such that it is substantially flat and substantially transparent like the sheath 12.

In a preferred embodiment, the power device 14 is a solar energy collection and generating device, such as the photovoltaic sheets mentioned above, that is operable to produce electricity based on solar energy and is mounted on the sheath 12. In a preferred embodiment, the power generating device 14 is embodied in a transparent flexible sheet that is mounted on, or at least supported by, the sheath 12.

The light emitting elements 13 are preferably embodied as optionally large LED or LCD units or any other known, variable light emitting components. The light emitting elements 13 may also be arranged in a sheet-like orientation in an array and applied to the sheath 12. Each light emitting element 13 is preferably individually controllable based on unique instruction data or may be controlled as part of a group of light emitting elements.

The communication device 16 includes information transmitting and/or receiving elements which preferably at least receive a signal that provides instruction data related to an aspect of generating light by way of at least one of said light emitting elements 13. That is, the instruction data received by the communication device 16 includes instructions, the instruction data, for the operation of the light emitting devices 13, preferably to provide a desired image on the display device 10, as mentioned above.

The communication device 16 may include transmitting operability, such as for providing information related to aspects of said light emitting elements and/or said power devices 14 and/or information related to another aspect of the light emitting elements such as positional information related to a data management system associated with these components. In addition, as noted above, the communication device 16 may include processing capabilities to provide control signals to the light emitting elements 13 based on the received instruction data.

In an embodiment, the control element 17 is a computer and data management device, which may or may not be linked to one or more database. The control element 17 manages at least an aspect of operability of one or more of the components described above embodied within and/or supported by said sheath 12. The control device 17 preferably provides the instruction data related to the desired display image to the communication device 16. As noted above, unique instruction data may be provided to each communication device 16 of each display device 10 to control operation of an individual light emitting element 13, or of a group of light emitting elements.

In an embodiment, the power device 14 conveys and/or stores energy generated by the generating device 14 at least for the purpose of providing some energy to a light emitting elements 13. As noted above, the power device 14 preferably includes a generating element 14a that generate electricity and a storage element 14b that stores energy. The power generating element 14a may be any of the sustainable generating elements discussed above. The power storage element 14b includes at least one power storage element, such as a battery that is preferably maintained by and/or within said sheath 12, such as a "folio battery" for example. Such folio batteries are known to be a valued way to maintain stored energy at least on surfaces that are flat and/or semi-planar. While it is preferably that the power device 14 provide all the power necessary to operate at least the light emitting elements 13, power from other power sources may be used. In addition, the power generated by the power device 14 is preferably used to power the light emitting elements 13, however, may also be used to power other components such as the communication device 16, for example. In addition, power from the power device 14 may be transmitted out of the device 10, via the connection to the control device 17, for example, to power external elements and/or for contribution to the electric grid, if desired.

In a preferred embodiment, the device 10 also includes energy and/or information conveying conduits, such as wires, optical fibers or other useful conveying elements for relaying any such energy or information to and/or from at least any of the other components discussed above, and preferably also to external system components. These elements are also preferably translucent or semi-translucent. In one exemplary embodiment, a transparent polymer film may be coated with indium tin oxide (ITO) to make the film electrically conductive. Such conducting films may be used to transfer power and data in the device 10.

In addition, the device 10 preferably also includes a light affecting filter 22 (see FIG. 2) which may affect light at least coming through the device 10 from one direction. At least one of these filters 22 may be a directional affecting light filter, such as the known "privacy" filters made by firms, including the 3M Company. The device 10 may include a custom version of such a privacy filter to allow for not only limitation of transmission of light to the sides, but to selectively limit light from any direction in favor of at least one preferred direction.

The synching device 18 is preferably a portable device such as a PDA, smart phone, netbook, laptop computer etc. that is wirelessly linked the display device 10, preferably via the control device 17, or directly as discussed above. The wireless connection is illustrated as a dotted line in FIG. 1, for example. The synching device 18 preferably manages information of at least two of said light emitting elements 13, at least relative to each other to provide a desired image on the display device 10. The synching device 18 is preferably capable of evaluating at least positional and/or light emitted by said light emitting elements 13 and/or components associated with them for the purpose of at least affecting an aspect of their light output. In one embodiment, the device 18 is a "smart-phone" and/or a system specific wireless device, provided with computing access and/or operability to fulfill at least a coordination function relative to at least a plurality of said light emitting elements. This PDA device 18 preferably manages positional information relative to the light emitting elements and/or visual information, by way of a camera device embodied within and/or linked to the system. That is, the synching device 18, preferably includes a camera or other imaging element that is used to analyze the actual image provided on the display device 10. In particular, the device 18 analyzes the image and may provide synching information related to specific light elements to modify their operation to provide the desired image on the display device 10. The synching information may be transmitted to the control device 17 which may use the synching information to provide the instruction information used to operate the light emitting elements 13. In another embodiment, information Is provided directly to the display device 10, or devices to modify operation of the light emitting elements 13.

Involving the above components in an operational scenario of the present system and method, the following is a non-limiting example configuration of the invention.

The display device 10 preferably includes the sheath 12 provided with very thin solar collecting unit (power device 16) imprinted onto, or otherwise attached to at least one "layer" of the sheath. Within that layer, or in another layer, preferably being the top, or an outermost layer, the light emitting element or elements 13 are provided, preferably in the form of LED devices capable of generating light of at least a range of different colors. In this example, the LED's are convex, relative to the sheath plane. In at least one configuration, the solar devices (power devices 16 or generating element 16a) are also maintained as an aspect of these convex components. The additional surface area of the convex component portions is desirable relative to light gathering and light emitting effectiveness, in certain cases. Alternatively they may be substantially flat such as the photovoltaic film discussed above.

The convex LED's are provided on the sheath 12 in an adhering step, preferably involving a chemical, adhesive, heat or otherwise imposed process for providing the LEDs to the sheath in as sturdy and as unobtrusive a way as possible. Any suitable adhering element or process, however, may be used. The LEDs are provided in such a manner to avoid obstructing the view through the sheath 12, from at least one direction. In a preferred embodiment, the display device 10, which is embodied on the sheath 12, is applied over at least some windows on a structure, wherein the ability at least during the day to see through the glass and the sheath 12 is desired. The display device 10, may be applied to virtually any surface of a building or other structure as desired. As noted above, any light emitting device may be used and the device is not limited to use with LEDs.

The inner side of the sheath 12 is preferably provided with an adhesive aspect (see element A of FIG. 2) for easy installation on any surface. As mentioned above, a display sheath D including several display devices 10 may be incorporated into a roll for easy storage and installation. This scenario may include display sheath portions provided from the roll with a long expanse of the components and also by smaller pieces; herein having a size under 1 inch in diameter. Each of these display sheath portions representing a device and herein each containing all of the relevant components necessary to accomplish at least desired light emission operability of at least one LED unit per piece. That is, each display sheath portion includes at least one light emitting element 13, a power device 14 and a communication device 16 to receive instruction data to operate the light emitting element. The display sheath D may be separated into the discrete display sheath portions, or groups, with each portion separated for independent operation.

More specifically, each display sheath portion, in this scenario, contains the communications device 16 for at least receiving instruction data wirelessly, a folio battery or batteries to store power as the storage element 14b and a solar light gathering and electricity conveying component (generating element 14a) to provide power at least to that battery 14b and/or at least one light emitting element 13. Such miniature signal receiving and broadcasting components are known to at least cellular technology.

In one embodiment, a functional display sheath portion includes a one foot portion of the rolled display sheath and is preferably two feet wide. This piece or portion maintains at least one communication device 16, one battery component (power storage element) 14b and at least one light emitting element 13. The invention provides for virtually unlimited component configuration options, including size of display sheath, spacing and size/power of light generating elements, and number/position of the linked display devices 10, including battery and/or communications components. That is a functional display portion may include a single device 10 or a group of devices 10. Further, the display sheath D may be cut and customized for application to a specific surface. Further, the display sheath D may include perforations to allow for easy separation of the display devices or groups of display devices from others.

It is important to point out that though preferably maintained within the sheath 12 any of the components may be maintained external to the sheath, though linked physically, wirelessly or otherwise to function in tandem with any components within the sheath. Further, the "sheath" may itself be replaced by multi-component units that may themselves be configured to be affixed to other system or non-system components and/or surfaces.

As is noted above, in an embodiment, several display devices 10 may be linked together in a continuous display sheath with discrete portions that are fully functional display devices. Each window, or other surface on which the display device(s) may be mounted may be of a unique size or shape. In a preferred embodiment, the display sheath may be cut cut/customized and adhered to the desired window or other surface. A plurality of LED's may be operated by a plurality of linked communication devices and power devices. Thus, a "group" of LED's, or a single LED may be addressed by the control device 17, or synching device 18. Further, for smaller areas on which system operability is desired, a single LED semi-transparent piece, or "sticker" may be affixed. That is the individual display device 10 may be embodied as a small sticker, which may be affixed to any desired surface. In addition, such a sticker may include multiple displays as well. Each device 10 may be individually addressed or addressable or multiple devices may be grouped together under a unique address.

Thus, herein, 300 windows, featuring 12 different window sizes/dimensions receive cut and adhered portions of the display sheath of display devices 10. Each of these cut portions represents one or more linked display devices 10 including the components described above fulfilling the tandem task of conveying power and imaging information to/from system components within a prescribed amount of the network of displays. Each sticker, for example, includes all of the necessary energy, communications and LED components required to use the LEDs to display information and are preferably positioned within the sticker with a less than a 1 inch diameter. Again, these are exemplary sizes and configurations only, not meant to limit the myriad of options for system configurations fulfilling other objectives.

Herein, beyond said windows being covered with display devices, steel aspects of the building between windows may also be covered. Once a side of the building, which herein is includes irregular angled surfaces and shapes, is covered or covered to a predetermined amount, for example 90% of the total surface area, the side of the building mostly facing "Central Park West" is in New York City, for example, is rendered able to be illuminated now by the LED devices. Indeed, many irregular window and surface angles constitute this "side" of the building scenario, which would typically make the installation of a "straight on" visual option effect difficult. Herein, the present improvements address this issue and surmount the challenge by allowing for a uniquely corrected display of visuals.

Individual display sheath portions including multiple display devices 10 or stickers are installed, with their energy storage aspects now charged from daylight that for hours the solar components provided as electricity, regionally conveyed to each battery aspect that each solar component was linked to. At least one PDA device (synching device 18) is maintained, preferably in a static position relative to the building surface in question. The communication devices 16 of each of the display sheath portions on the building are in communication with the PDA device directly and/or by way of a linked system data managing aspect, such as through the control device 17, which may be a wired and/or wirelessly connected to the Internet or other network connectivity, for example. Indeed, each LED, or individual display device 10 may be associated with it's own "IP ADDRESS," for example, in one configuration, demonstrating the specific addressability for the providing of visual information to the surface with extreme detail and specificity. Further, the control device 17 may be virtually any device provided on a communication network, such as the Internet and communicates with each device 10 based on its IP ADDRESS or other unique identifier. That is, while the control device 17 may be a local computer, it may also be a remote computer connected to the device 10 or devices via the Internet or any other communication or data network.

Herein, the PDA device (synching device 18) for example is an IPHONE® (a registered trademark Apple, Inc. Corporation California) with a special downloaded software application specifically for managing any displays configured with display elements described herein. The software application, herein, includes special compensation programming to account for hand or other motion of the IPHONE during set up, which involves synching the LED units' output relative to each other and the IPHONE. In one synching example, the IPHONE application, linked to computing maintaining the addressable LED units, provides synching information related to the image, one pixel (LED element) at a time, to the LED devices as a displayable image.

In providing the image in a known sequence of image aspects, such as pixels, the related number of LEDs, light emitting elements 13, display that pixel of information or information representing an image aspect beyond a single pixel, (such as an averaged group of pixels). As the IPHONE camera unit captures each LED's emission as it displays it's information in the random configuration of LED's, the IPHONE application provides operability to revise the sequence of LEDs to which image information is provided represented by the synching information, after evaluating the actual position of each LED, relative to the others and/or to the IPHONE. This occurs until the desired image is manifest by the revised sequence of LED's thus providing a comprehensible rendition of the image the IPHONE is managing during the synching/setup process. This synching process may involve a plurality of full image transmissions associated with the application, to allow programming to acceptably recognize at least the image manifest zone within the image capture area of the IPHONE and to acceptably recognize enough of the LED devices relative to their location in relation to at least their addressable information, such as IP address or other unique identification information related to the position of each light emitting element 13.

Once a single image is properly rendered on the building facade, the system is now capable of providing any still, or motion, video data as visual information displayed by the façade; the numerous imaging components now linked by their communications components and now, at least relative to one position, functioning to provide imaging information comprehensibly. That is, the control device may generate instruction data to modify the displayed image as desired once synchronization occurs using the synching information.

Further, the option now of providing the image information to a viewer STRAIGHT ON relative to another point, such as directly in front of the building, is provided. Image data managing programming in the control device 17, for example, may alter the instruction data provided to some or all of the LEDs to allow for any position within sight of a plurality of the LED's to be the "vantage point" from which the image display may be coordinated. Thus, for example, algorithmic modifications to image data may allow the IPHONE position, to initially be the position from which the displayed image data appears to be correct, despite any angle relative to the building and/or any angle of various building surfaces affecting a single, smooth plane. Modifications of display may even be accomplished, in one configuration, with factoring for differently shaped and positioned surfaces on which the display devices 10 are positioned, as an initial synching may reveal through image aspect analysis programming, which aspects of the image had to be altered for proper perspective rendition of a test image from the initial IPHONE synching location.

With proper accounting for a plurality of such involved surfaces, mathematically implemented revisions to instruction data (information) may be accomplished with assumptions of necessary modifications for those surface aspects affecting image rendition, to potentially provide a corrected, properly recognizable and presented image from any other position from in front of that building side. Preferably, such a revision to the display would involve a resynching of the display related to the synching device 18 from the desired new perspective location, to accomplish the task with visual confirmation of the desired result. That is, while the control device 17 preferably includes processing elements suitable for providing instruction data reflective of a desired image from different perspectives, it is preferable to confirm these different views using the synching device 18.

Thus, repositioning and/or resynching the PHONE, synching device 18, relative to the building, involving a reuse of camera capture feature and/or simply a refactoring of positional data at least relative to the IPHONE, may allow for a revision to the overall displayed data to provide a proper perspective and illusion of seamless, straight-on image, from any point in front of the building side. Just like a flat screen monitor, the irregular surface covered by LED's appears straight on thus, as a great benefit of the present system. Thus, a building may selectively provide a desirable image perspective to audiences that occur at an angle or otherwise offset, relative to the collective display surface area. Other known image modification options and effects may further be implemented to the displayed image, once the irregularities of the display surface(s) are known to computing managing the image modifications Further, such variable image data managing options, may allow for the perspective to alter, for example relative to the IPHONE, or otherwise identified moving objects or programmed options for modifications. For example, a taxi driving by a building including the display device 10 may be identified by directly received and/or reflected signals and/or information (including light,) and based on this analyzed information optionally frequent revisions to at least an aspect of image display may be affected by system computing. This, for example, to maintain a properly visible image to those in the vehicle for as long as possible.

In yet another configuration of the invention, operability related to the components' synching options are further enhanced through additional programming options. One such option includes the PDA device (synching device 18) associated with synching at least one visual display aspect including positional operability for revising at least an aspect of information conveyed to the visual display aspect related to light output, in association with at least one GPS related instruction.

Herein, an initial synching of information associated with affecting light output aspect of at least a plurality of light generating units of a display(s) is accomplished as generally described above. Preferably this is accomplished as disclosed, involving at least two image captures managed by a system linked computing device(s) involved in revising the image information conveyed to at least two light generating units associated with manifesting prescribed portions of at least one visual; provided herein by way of digital image data. Again, other positional references involving at least one point of reference relative to the light generating elements 13 may be employed, whether GPS associated and/or involving system components with known positions relative to the light generating units.

The improvement provided herein, includes a specific hypothetical basis of revisions to the information conveyed that affect the light output of light emitting elements 13 to affect at least a change in perspective of the image manifest by a plurality of such units, relative to at least one visual point of reference. For example, if a PDA (synching device 18) with imaging functionality and with clear line-of-sight to preferably all of the light emitting elements 13 associated with the intended display of an image captures a plurality of images, a basis for reassigning the known order of the light emitting elements is provided. This allows a random array of addressable light emitting elements generating to become an ordered array of units, with each light emitting element's position becoming acceptably known and addressable by system computing associated with manifesting display image, that is either by the control device 17 or synching device 18.

The hypothetical basis mentioned involves the designation of at least one other position, relative to the light emitting elements 13 and the PDA, the synching device 18, or other linked device. This position is then associated with triangulating positional aspect of said units relative to a desired image manifesting result. In one example, a map or other indicator familiar to PDA device software applications may provide a visual and even tangible reference point revision instruction ability understood by components of the system herein. Thus, images that have been synched and allocated specifically for a desired image manifesting result by a plurality of light emitting elements 13, which may not be on a single and/or even plane, may be "resynched," or revised, simply by tapping a place on a map that represents at least a portion of the known space from which light from at least a plurality of the associated light generating units is visible. That is, the synching device 18 preferably includes functionality to provide synching information suitable for modifying a perspective of the desired image and allows user to resynch the image displayed to a new perspective simply by selecting the desire position on a map on the device 18.

Thus, for example, whether GPS informed or otherwise spacially informed by local components, the potential to both "resynch" an image directly by repositioning a PDA device (synching device 18) and to revise the image based on a hypothetical new position of the PDA device may be accomplished. This, by triangulating the position of a plurality of linked system components, such as satellites and/or local positional referenced components, and applying at least one mathematical revision to digital image data to be manifest by the display 10 (via the light emitting elements 13 featured on that display assembly) to approximate the necessary image data modifications for providing the image synched (and/or aligned) to a primary location to align and comprehensibly provide that image to a secondary location. Algorithms are commonly associated with such digital data modifications.

Thus, a certain point of reference in CENTRAL PARK, for example, may be the image manifesting perspective reference to which a display involving many irregular window surfaces of at least one building is aligned and oriented. This primary location thus has line-of-sight of images that are in normal and "straight on" perspective visibility and comprehensibility to people at and/or in the vicinity of this primary location. By "tapping" a place on a displayed map or otherwise providing a special instruction to an imaging managing software of the system featured on a PDA device display (and/or addressable by such linked device(s,)) a different place within CENTRAL PARK may then be provided with a desirable image manifest perspective of the displayed image. The primary location may now not see the image in proper perspective following the revision of imaging data, in most cases.

For example, from the boathouse of CENTRAL PARK a visual of a FACE may appear perfect and even, as though viewing that face "straight on" as it is manifest on the TRUMP BUILDING windows, of Columbus Circle. After tapping a new place on a GPS associated geographic reference, such as a map provided within a PDA device application on the synching device 18, the revision to digital data now provides that FACE image to that new point of reference as thought that FACE were straight on to that new point of reference. Foregoing other multiple points of reference functionality potential of the system, (which could be involved in some configurations to allow for multiple points of reference with similar views of the FACE manifest by at least some different system components,) the single image herein would become distorted to the original position synched by the PDA device, for example, as it becomes seamlessly "straight on" and in proper perspective to this second point-of-reference indicated.

The above would thus essentially allow the synching device 18 to provide synching information to modify the image displayed on the display device(s) 10 to a different perspective without having to actually move to a location with a different perspective. That is, without having to go to that new "place" to resynch, as all light emitting element irregularities are known to from synching at a first point of reference, image synching could be factored to at least some degree in revising image data for the new point of reference. This preferably involves estimating by system programming the likely irregularities of the positions of the light emitting elements relative to the second position based on what was learned from at least the first position's compensation for any irregularities. That is synching information related to a second perspective may be estimated based on the synching information generated by synching from the first position and perspective.

Again, a physical visually based resynching of components via a wireless PDA device (synching device 18) equipped with specific programming/application(s) for this purpose would surmount irregularities that are not fully informed for proper image revision for a second point of reference. Though, as such irregularities may be increasingly "known" to the system from a plurality of different PDA image synching positions, (such as two or more different points in the park allowing the system computing to learn about the display irregularities more than just one,) the likelihood of best acceptable image manifesting relative to a hypothetical viewing (and/or synching) position is improved by each additional/new image synching position relative to the display known to system computing. That is, each time the synching device 18 is moved to provide the synching information based on actual image data gathered by the imaging apparatus, or other matter, the device 18 will be better able to estimate synching data for other positions without having to move the device to these positions.

Once a proper quantity of data about the display irregularities, such as surfaces on different planes relative to a point of reference(s,) any potential point of reference within line of sight of the display(s) 10 (involving a plurality of the light emitting elements 13) may be quickly indicated as the desired point of reference for proper perspective viewing of the image data. This, even if the building itself is angled relative to that position and/or if window(s) featuring light emitting elements 13 are opened at that time, changing their plane and/or other temporary and/or permanent image manifesting influences occur to aspects of the display.

Figure 5:
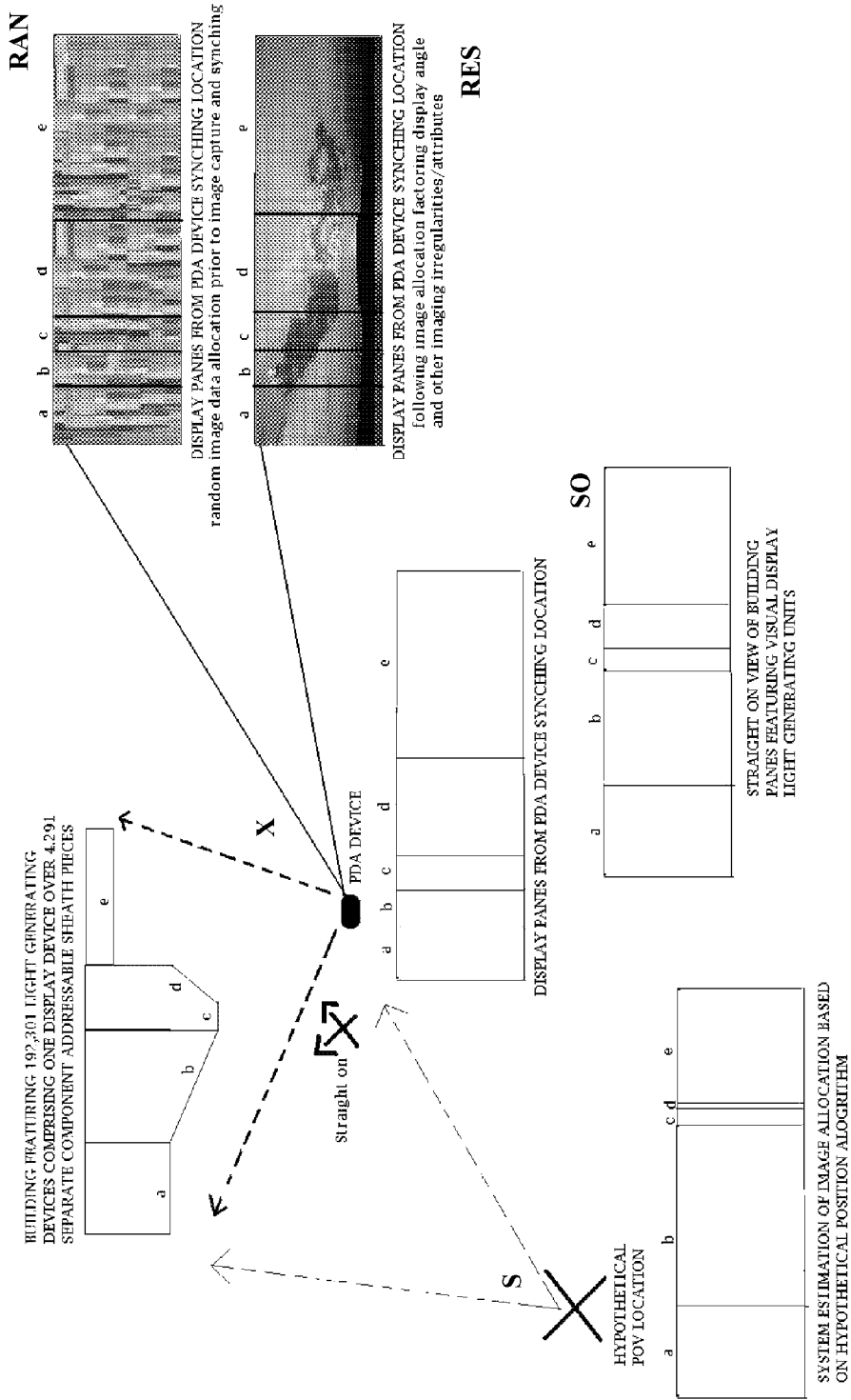
FIG. 5 is an illustration related to additional functionality of a synching device in accordance with an embodiment of the present application.

FIG. 5 illustrates an example of these operations. The surface profile of the building if viewed from "Straight On" is represented schematically in the illustration SO. Initially, the instruction data is provided to operate the light emitting elements 13 such that a viewer viewing the surfaces a, b, c, d, e is presumed to be doing so from Straight On, so the surface has the contours of image SO. In FIG. 5, the surfaces a, b, c, d, e of the building are shown as if they are being viewed from above. From the primary position X, however, where the viewer is not viewing all surfaces "Straight On" and a more random image illustrated in image RAN is observed. The synching device 18, however, provides syncing information to compensate for this such that it is resolved as illustrated in image RES. According to the additional functionality above, the synching device 18 may also provide appropriate synching information related to a viewer standing in hypothetical secondary position S such that the light emitting elements 13 will operate to provide the desired image to a user standing in position S even though the synching device 18 is not physically moved to position S. Instead, the synching information that is generated based on the actual positioning of the device 18 at position X is used to estimate corrections that would be required for a user standing in position S.

While FIG. 5 describes and illustrates the use of the desired display for synching, it is noted that the synching device 18 may generate the synching information based on a test patterns of sorts, that is, the synching device 18 may image a pattern of selected light emitting elements. The synching device may compare the image information to the pattern and generate synching information to align or synch the light emitting elements. The pattern may include a sequence of light emitting elements emitting light which will also aid in establishing a position of each of the light emitting elements 13 as well. In addition to position, the synching information may also indicate changes in brightness and/or color changes of specific light emitting elements. For example, depending on ambient light conditions, a red light may appear differently. The synching information preferably reflects changes required to compensate for such inconsistencies.

Further image managing options may include directional management of the displayed images, including filtered directionality of the LED light, for example using privacy filter technology such as those manufactured by the 3M Company and/or by special fixed and/or variable configuration of the light emitting aspects of the display, allowing for visual pollution to be reduced by directing images in certain directions and not others. Further, the option of night only display, herein, allows daytime to leave structures visually unaffected by advertising or system aspects, (such as the sheath,) as they become virtually invisible if desired allowing cityscapes, for example, to remain unaltered during daylight hours as an important additional benefit.

Further, by providing visual display aspects selectively with different handling, some such LED's or light generating elements 13 may be associated with a visual being displayed in one direction and/or with image modifications based on one focal point while a distinct and potentially different visual may be conveyed and/or altered for viewing from another point. Thus, a single surface may provide a plurality of visually displayed images to different viewers some distance apart, allowing one to see one visual and the other to see different visual acceptably. Viewers may even be targeted based on their position, established by system component analysis of them physically and or by signals generated from such aspects/components, such as a site, may affect and even purchase services resulting in the displayed visual(s) being affected viewers. Further, viewers knowingly or unknowingly engaging interactively with linked system.

Further, the present system may provide, through linked components, not only energy for use in displaying information, but for providing energy to external components to allow daytime solar energy gathered to provide further energy benefits to the display embodying structure and/or beyond. Though, perhaps most important, is that the components of this system may be self powering, requiring no external energy or connections to allow for the comparably simple installation and operation of potentially enormous visual display devices. Such options are typically limited to large units requiring larger amounts of energy, space and in the case of billboards, remaining as daytime visual aspects of the city, however undesirable aesthetically.

Naturally, the present display device and system may also provide images during the day, selectively, though without the obtrusive creation of structures for this purpose only.

Further, the present system and display options allow for existing structures to generate revenue from at least media sales, or other benefit from displaying information to the public that otherwise would be limited to such specially provided display structures including billboards. Further, the present system allows for unhindered viewing from inside the supporting structure to the outside, through windows for example, despite the existence of the display device 10 affixed to the window surfaces. This may even be maintained while the units are illuminated, entirely or in part, by shielding the light generating elements from emitting any or much light in the direction of the supporting structure.

Further, the present display device or system may be provided in it's semi-transparent or an opaque affixable configuration to many publicly visible objects, including trash cans, phone kiosks and the like. Even conventional billboards can be covered with the display device or related configuration options, to allow that billboard to become affordably and quickly a full video, direct display, device without need for building a large, energy using installation to replace the conventional billboard location as is typically necessary. Further, the present semi-opaque sheath/sticker options, for example, provide that a conventional billboard may provide the single printed "reflective" ad image during the day as is conventional with the light generating/emitting elements 13 coming to life at night, allowing for related or other images and/or video to command the night display of the board. Further, this may simply be to provide the existing or other images without the need for costly and energy consuming reflective lighting to make the reflective conventional art visible. These may or may not be entirely opaque, depending on the configuration.

Further, the display sheath portion or sticker may be printed with reflective imaging aspects, such as portions of an advertisement, to embody both reflective and light generating visual information. This, providing further functionality for the issues of daytime and nighttime media display, beyond the issue of providing potential "invisibility" of display components during the day, for example.

A further configuration allows at least some of the disclosed components to be supported by a fabric or otherwise fibrous sheath and/or expanse, instead of the transparent or semitransparent or opaque sheath described above. LED elements embodying expanses, which may be draped and/or maintained at typically four corner points to establish installation, are known. These may display video-style images today, whether still image or motion visual sequences.

Such an optionally semi-transparent or opaque draping would allow for solar and/or wind and/or other power generating elements 14a to be at least in part incorporated into it's expanse. These may function autonomously or in conjunction with at least external energy and or visual display related components. As with the portion/sticker innovations, the (fibrous) expanse would allow for non-adhesive draping of the system operabilities.

These would be at least valued in more temporary public display scenarios and/or those circumstances when direct contact with a structure at so many points may not be feasible or reasonable to execute. By allowing for a blanket style expanse to be maintained, at one, two, three, four or more points, locationally, wired and/or wireless addressability and energy generating and/or conducting is maintained as with the sheath, herein within the expanse. In essence, this represents simply an alteration to the components' supporting medium/media, to address at least logistical issues of installation.

In yet another configuration, the sheath or comparable containment of at least the light emitting element 13 includes at least one filtering aspect, such as filter 22 of FIG. 2. This aspect is preferably configured as a layer of the containment, which itself is preferably configured as a transparent or semi-transparent flexible sheath able to be cut or otherwise fragmented into potentially unique shapes and sizes. Each fragmented portion of sheath thus becoming a distinct component of the apparatus, including at least one light generating unit per fragmented portion, if not also one or more of the other components disclosed in relation to the energy generating, storing, conveying, addressing aspects of the invention.

The filtering layer 22 may include light filtering functions, including known options for reducing overall light conveyed through the sheath; direction of light conveyed through the sheath; color of light conveyed through the sheath; glare reduction among other fixed and/or variable light altering options known. Such options include filtering functionality employed in civic projects, including window systems of buildings, lighting and filtering systems for entertainment image capture and still image capture, landscape illumination, among other industry(s) filtering innovations operable to be incorporated into a flat and/or flexible sheath configuration.

Directional filters, affecting visibility of light from certain angles relative to the sheath/containment may be incorporated to allow for continual and/or intermittent and/or otherwise variable directionality of the light output of the apparatus and/or any component thereof. Through this functionality, a display system on the front of a building, for example, may allow viewers in one area relative to that display to see the visuals/light manifest by the light generating unit(s) while others positioned differently relative to the display may see little or no light output from the display (and respective light generating unit(s)).

In another configuration of the invention the operability of the individually addressable components of the system are further demonstrated.

As few as one light emitting element 13, coupled with a communications device 16 and a power device 14 may allow for a non-fixed application, or moving scenario, of display elements and/or components. These system component groupings will be described herein as "groups" for the sake of this example, wherein each is a "group".

These groups include at least one light emitting element 13, at least one receiving component, such as a receiving component of the communication device 16, associated with information provided that affects the light emitting element and at least one energy providing aspect, such as a power device 16, to power at least the light emitting element 13. This energy providing aspect may be a battery and/or energy generating device, such as a solar energy generating component.

Herein, the groups are provided on substrates that are not fixed, relative to each other. For example, floating substrates 12 provided by at least one material and/or operable substrate component that floats, may allow for a plurality of light emitting elements 13 to move with the flow of water, relative to each other. Thus, in order to provide an acceptably viewable visual, such as a sequence of digital video images, these units must be addressable by a system computing aspect, such as the control device 17 or synching device 18, managing both image data and positional data of the groups, at least.

Provided for this application and configuration are communication devices 16 for each group. In one configuration, triangulation of position familiar to GPS positional systems is provided, either by satellite and/or by local equivalent positional components. Transmissions from each group allow for positions of each group to be updated by system computing with selectable frequency.

Thus, image data, or instruction data, provided to the groups for the light emitting elements 13 to manifest in tandem operation, would be frequently provided and/or transmitted to the groups with image data repeatedly reallocated based on updated positional information of each group as they move within a desired display area, such as the confines of a swimming pool for example. Thus, the frequency with which each revised positional evaluation of the groups relative to the image aspects of an images to be manifest by the groups as a comprehensible visual, or series of visuals, will dictate an aspect of image manifesting quality that is selectable and potentially quite seamless and acceptable to most viewers. Further, the pool example demonstrates that energy generating options may not only be solar, but may be derived from the heat and/or motion of the water using piezoelectric material, for example, or other scenario where energy may be extracted by the components of the groups.

In the examples described above, solar energy provided an example energy generating scenario for such groups, though clearly energy could be extractable from the heat of a building or other source accessible by the group's components. These include the stresses caused by impositions to aspects of the groups, by wind or sound for example, demonstrate other potential energy providing/extracting/generating options of other system and method configurations.

In a preferred configuration, a camera, or other imaging device, such as a digital video camera, linked to computing managing image data conveyed to the groups preferably through wireless transmission at least to each group (if not also from each group,) would provide updated information about the shifting position of image aspects relative to the groups. This may be embodied in a device similar to the synching device 18 described above. In fact, additional imaging impositions, such as test emissions conveyed to and received by the groups, may even be married with and/or transmit with and/or in relation to the image data to seamlessly allow the camera (or other component(s) managing at least positional information of the groups) to both reevaluate at least positions of each group and to affect image information conveyed relative to desired visuals for viewers to witness. Such a camera would preferably be positioned and framed, whether fixed or not relative to the pool or other relevant fixed object(s,) in providing information for the desired imaging/effects result.

Further, a camera capturing a plurality of images from the groups tandem image manifesting light emissions may provide further modifications to the images manifest by a series of groups wherein at least some of them are moving relative to each other. These may include computer managed alterations to color, perspective, brightness, contrast and other familiar imaging impositions and/or other modifications familiar at least to digital imaging technologies. Thus, changes in lighting surrounding the groups may affect image data conveyed to the groups, as well as the desired perspective of the image (s) manifest, relative to at least one anticipated viewer of the display image(s).

As noted above, the substrate 12 may be provided as a thin, flexible film, such as celluloid or other familiar transparent, semi-transparent or even opaque flexible surface or sheath.

In another configuration applicable to at least some of the previous configurations, the substrate 12 may be other than a flexible film, sheath or comparable components supportable material. Though foregoing the option to "cut" or otherwise easily fragment the groups relative to each other, in providing the separate components of a single display for example, the option of SOLID or non-flexible materials as the substrate is provided. Glass is one example. Another such example is transparent or "glass concrete," providable in optionally sized portions such as bricks. Such semi-transparent materials as these, which may constitute a thicker and less flexible substrate option relative to at least the previous configurations disclosed is disclosed in materials including translucent concrete in which glass fibers are provided in the concrete for fortification and translucency. That is the substrate 12 may be made of a more solid and non-flexible material. In this case, the light emitting elements 13 or groups discussed above may be provided within the material itself. For example, the light emitting elements 13 or the groups may be dispersed within the translucent concrete discussed above.

Referring again to the unfixed swimming pool groups' example, the substrate may even be a component unlike a sheath, designed to support the components of a group to float, or otherwise be fixed or not relative to other objects affecting computer management of image information transmitted to the groups. This may for example, be imaging aspects placed on the roofs of cars, or other moving objects, relative to at least one imaging reference position, such as a building roof location, airplane, balloon or related synching point(s) of reference. In this example, the substrate itself may be an aspect of the vehicle, or aspect of a material attached or affixed to the vehicle(s).

Further, components affixed to a board, paper or other transparent or non-transparent material, may provide that thousands of audience members, such as in an audience of a stadium, may each hold at least one display device aspect of a single desired display assembly, wherein a television camera(s) may capture for a viewing audience image(s) manifest by the audience participation for the home viewing audience Not unlike an audience holding the color panels that Olympic events have demonstrated can provide comprehensible tandem visuals for viewers, such as a home TV viewing audience, the present configuration allows digital images including motion video to be manifest by such fixed or un-fixed light emitting components or display devices. This, by way of the updateable visual information that such groups (of physically separated but electronically linked) components may manifest for various effects purposes. Again, at least one point of reference to which display data synching information is related, would preferably be provided and in most cases this would be also related to at least one camera's position. This camera may be a synching reference camera aspect and/or a camera capturing the resulting display image(s) for other purposes, such as broadcast, cablecast and/or distribution via other information networks such as streaming video over the Internet.

In another embodiment, imaging elements, such as the light emitting elements 13 are provided to the "fronts" of buildings, meaning their façade including glass and/or window aspects, surfaces in cities for example become potentially lucrative and/or beneficial beyond their current potential.

Buses feature familiar advertising "mesh" that is actually printed plastic or other material, provided to the surface incompletely. For example, the printed material provided onto the surface of the bus, or other object, covers a percentage of overall bus window surface area, and other surfaces, while leaving enough of the windows unobscured to allow those inside the vehicle to see through to the outside. Though a reduction of incoming light is a common result of this type of "advertising," that itself may fulfill two goals of reducing heat and glare inside the bus, while providing advertising to those outside who see the bus (or other object).

Herein, this applied "mesh" or partial glass coverage approach, is provided though with a difference. The mesh herein includes a light generating aspect using light emitting elements 13, for example, preferably reserved for one side of the mesh, with opacity on the other preventing that light from entering the structure on which the mesh is applied, as much as possible. The "mesh" is in fact embodying electronic component(s) that are interconnected, as with special-circuit Christmas tree lights configured to maintain independent lighting capability for each light when one in the series goes out and/or is damaged.

This electronic network configured to present a plurality of pixels, or their equivalent, over a given surface, (such as the front of a building,) is one example configuration of the display aspect of the invention. Another example, are opaque and/or semi-opaque light generating components, such as individual unit(s) capable of generating light corresponding to at least one pixel(s). These units would preferably provide light outward, relative to the surface supporting them, such as the glass front of a building. Further, they would allow preferably for an acceptable visibility from inside the building, at least during the day. For example, the light generating elements would, in one configuration, be clear and/or semi-opaque until and/or during times they were electronically or otherwise illuminated.

In yet another configuration, the front of a building configured for display, might be exclusively a night display as mentioned above. Whether direct video or configured to reflect visual information, such as a projection, the surface would be at least semi-opaque over at least part of it's total surface, such as windows/glass.

At night, these surfaces would be covered by reflective material and/or equipped to reflect enough light to become projection "screens."

For example, energy generating panels, or components working in tandem with them, could be in place permanently or could move into position, providing energy generating operability, (be it sound, wind and/or sun, or other stimuli based). This, while in tandem providing direct light transmissibility and/or light reflectivity, in order to provide visible images to those within viewing range of the building or other surface. An example of "moving into position," might include panels dropping down over window areas, all or in part, from behind or in front of surface areas not featuring window(s). In this way, opaque or semi opaque panels might cover the glass surfaces during the night, allowing for manifesting images on the overall surface, during at least the darker hours of the evening and/or night.

Further, important configuration options might allow for imaging components, for example, to themselves "move," with wind stimuli. For example, thousands of rotating small surfaces, each being light generating and/or reflective, could provide in total enough image related light to viewers to constitute an acceptable imaging apparatus. This, while the moving elements of the "screen" could be generating energy, and preferably at least enough energy to power the imaging aspect(s) of the system. Further, these moving elements might provide energy during times the imaging aspect(s) were not activated, for example, during the daylight hours.

Further, glass itself might be a hybrid, multifunctional aspect of the present system, wherein the glass incorporates permanent of variable reflectivity, allowing for both daytime viewing of the outside from inside a building, and nighttime reflectivity, of a projected image for example. Further, such glass might include semi-opacity by nature, including selectively small portions of such glass embodying light generating capability in one direction, including the operability to alter the color of the light generated; for example allowing for enough portions of independently variable illuminated portions of glass to constitute an overall viewable image. These glass "portions" could be linked to an information providing network, capable of providing both necessary energy and instructions (instruction data) to multiple panes, in relation to a video image represented by digital information, for example.

As with the previous example, these panes may within their independent design, incorporate elements capable of generating light without unacceptably obstructing daytime (at least) viewing from within a structure, through these panes to the outside. Thus, the panes may provide an opportunity to transform an entire "glass" structure into a light generating and/or reflecting device, capable of featuring at least one video feed, such as an NTSC or other type of compressed or uncompressed digital video signal.

Further, herein these "panes" would work in tandem, within their own design and/or with components functioning in conjunction with them, to generate energy capable of being stored and/or converted for use as electricity or another familiar energy type. Solar components and/or those familiar to generating electricity from vibrations caused by sound and/or wind, might be situated in concert with such panes. Preferably, at least one of those energy generating operabilities would be embodied within such panes, allowing for example, solar and or vibrational stimuli to provide even small amounts of energy to central energy gathering elements, preferably through the same connectivity providing energy to the units, when configured to generate light in relation to imaging information managed by a linked computing operability.

In yet another configuration, replacing and/or working in tandem with any or all of the options described, moving turbines from wind generating components connected at least to the building featuring a surface used for imaging, could be incorporated into the building and even potentially the surface design, to allow for all or part of the energy generating functionality. Such units provided with this system would provide energy to a building during the day, for air conditioning or other uses for example. At night, while still generating energy, these could contribute and/or provide the energy necessary to power at least the electricity needs of the displaying operability related to the surface in question. The energy devices 16 described above may also be used to supply energy to the building on which they are mounted as well, if desired.

In another embodiment organic light emitting diode technology (OLED) display systems may be used. These flexible display innovations include typically a visual display aspect capable of changing visuals displayed in accordance with video information, such as digital video data.

Also known, are systems for converting vibrations caused by sound, wind and other physical influences affecting aspects of system components, into energy such as electricity, as noted above. An example of this is a system for converting the vibrations of a dance floor being altered by peoples' weight being shifted randomly across aspects of a vibration to energy conversion planes.

This operability may be provided to each of said entire screens or to aspects of these screens. Further, in scenarios where the use of the actual image manifesting surfaces of a display are not provided with separate operability to react to said influences, adjacent and/or distinct components occurring at least within the area defined by said wall, could be used. For example, energy generating, variable surfaces and/or other components may occur adjacent to said screens on a single plane substantially if not literally. Further, such variable surfaces/components may occur in a different situation within the designated wall space, not solely on substantially the same plane as the screens. For example, all or a portion of such components involved herein in generating energy from such influences might occur behind all or part of said screens, either entirely or partially obscured by at least the screens.

Herein both a system and method for providing and generating energy based emissions valued by a plurality of involved parties, are disclosed To demonstrate this tandem benefit to various parties linked electronically to the same apparatus, for different benefits, the system, method and a manifesting configuration of an apparatus accomplishing the tandem functions, will be disclosed in relation to a MANHATTAN BUILDING which has a FIFTEEN STORY exterior wall, which is 100 feet wide, which is facing 8TH AVENUE, facing south and visible to traffic flowing North. With stories being 10 feet high in this structure, the ratio of the height to width is 1.5 to 1. This wall is exemplary of any surface, exterior or interior, flat or not flat, and is simply meant to demonstrate a valuable configuration of the multifunction innovation.

This OLED display, hereafter the "display," is comprised of at least one, but preferably a plurality of independently programmable visual display surfaces; hereafter "screens." These may be small enough to display as little as a single typical "pixel" of information relative to a conventional monitor, or as much as an entire image such as a full television, computer or cinema image, or multiple images in such cases.

These screens are configured to receive information, such as digital video data and/or information derived from such data, for the purpose of manifesting typically a large single image by way of tandem display of aspects of that image by the screens. Thus, these screens receiving information and manifesting their visuals would provide a typical video visual, such as that displayable on a plasma monitor, computer display, PDA device, video billboard or other display device, to the entire display and thus the entire 150 feet by 100 feet size exterior wall. Again, the configuration option of a single screen being the display is also provided herein.

Further, the display may be part of an interactive display network which may target information to viewers at least based on parameters provided by those paying to provide media to the display and/or information derived by operability related to the display or a network of displays about viewers of the display. For example, a viewer agreeably providing at least identification information electronically, may be targeted by the system, which may include at least a linked operability with the wall display. Alternatively an electronic identification means may be provided to allow the system to glean provided and/or accessed information about viewers may be supplemented or replaced by a direct sampling operability of the system linked to the display, such as linked components for measuring physical traits of viewers, such as height, gender cues, fragrance and other related visual, audio and other electronically measurable aspects; capable of providing information converted to system compatible, and valued, data.

The present system demonstrates the tandem benefit to multiple parties, beyond the building owner who literally owns the wall surface. Herein, the beneficiaries of this example configurations layered operability include:

(1) The building owner, for example, "RUDIN MANAGEMENT," who offsets much of their energy costs through this system and apparatus, as in this configuration the display is "off" during the day," allowing for all of the energy generative from the wall to be used internally, for example, by the building to light and cool offices;

(2) A display network company selling and managing the media operability of the display, for example "CLEAR CHANNEL outdoor media.;"

(3) An interactive partner, provided with exclusive operability (in this example,) of their systems with the display system, which in this case includes the wall display herein, for example "APPLE IPHONE AND AT&T WIRELESS;"

(4) A power company who is managing the energy generating operability of the apparatus, and maintaining it and further gaining surplus energy from the apparatus on the wall when the building is not using or exceeding the energy generated by the apparatus, whether in real time and/or through the use of energy storage devices such as batteries: for example CON EDISON. Such a firm may return energy generated by the wall apparatus to their "grid," for example, as a valued aspect;

(5) The municipality, the city of New York, for example, who reduces the amount of day-time billboard "visual pollution" and clutter in the city, by allowing such massive, multi-purpose displays to exist based on their ad displays occurring only after dark (for example); and (6) Advertisers, who gain a unique size and position in the city, before not accessible for their messages and valued interactive exchanges with the public. This display, for example, is specially permitted, based in part on it's "green" function of energy generating, and in this configuration, the limitation of video being displayed on the giant wall at night only.

Herein, each screen is provided with distinct operability to vibrate and/or otherwise be affected by audio waves and/or other physical, electronic or other measurable influences. This distinct functionality would contribute to the tandem purpose of this apparatus provided to this wall, which is to generate energy.

Herein is further disclosed a hybrid revenue/value generating apparatus, powering the distinct multi-function commercial method for creating value from the tandem conversion of physical (and/or electronic) influences on the wall apparatus and the emissions of at least generated electronic emissions, including light. Further emissions could be generated and gathered, adding additional layer(s) to the multi-purpose system, method and apparatus, including the exchange of interactive transmissions from devices utilized by at least individual(s) viewing the display video, emitted as said light For example, a viewer of a COKE® (a registered trademark of the Coca-Cola Company) advertisement might use his IPHONE, directly or by way of a specific IPHONE APPLICATION, to provide information to computing aspects coupled with the display, such as the control device 16 discussed above, for example, such as a response to a displayed request for information. Further, the display may provide related media to such devices, by way of a distinct transmitting operability, providing the same media displayed on the board, or media designed to function cooperatively with the display media, (including the video images displayed.) For example, the display might solicit the user to play the lottery with his PDA device, providing at least means to immediately become a winner, not unlike "scratch off" lottery cards. Though, the lottery game promoted to the display viewer may be provided as distinct media from what the display is rendering, including interactive operability to transact informational and/or financial exchanges at least valued by the NY State lottery.

Though these may not be the only parties benefitted, they are examples of ones deriving extensive value from the hybrid functions of the apparatus powering the system and method, herein. These value aspects are extreme enough that, for example, CLEAR CHANNEL alone would likely be willing to fund the construction of the entire apparatus, for all or a portion of their right to provide media and even interactive functions to "the wall" that before were not possible in that location.

In fact, any one of the parties singled out as beneficiaries herein, would likely have enough long term benefit from such a display, or a plurality of such hybrid function displays, to fund the entire manufacture, installation and maintenance of a wall apparatus providing the various tandem functions disclosed herein.

In additional configurations of the present invention, various forms of energy may be harvested and/or generated by components of the wall mounted (or recessed, or otherwise incorporated into the building) apparatus. Piezoelectric component(s) are one example. Another example is an inverted audio generating device(s) configured to generate energy from sound or other atmospheric disturbances, including wind and other physical influences often involving air in the transference of their energy. Further, cellular and/or other electronic transmissions, including microwaves and other human generated and/or naturally occurring electronic transmissions, may provide component(s) of the display with energy harvesting potential, for conveying to the internal/external grid(s) of the energy system and/or to linked battery management/storing components, such as batteries.

It is important to include the hybrid configuration options, including solar, wind and other familiar energy generating and harvesting means that within the present configuration become aspects of an ELECTRONIC ADVERTISING DISPLAY. The improvement to either outdoor displays or such energy generating apparatus' and systems, is that the space available for just the advertisement conventionally is enhanced to allow for the distinct, though preferably linked energy generating and/or harvesting operability.

Returning to the initial example, herein described in relation to "Piezoelectricity" generating, solely as an example configuration, the preferred improvement is that the display panel(s) of the entire visual display literally embody an aspect of the materials familiar to that energy generating approach. For example, the actual, flexible display surfaces, or aspects of the OLED devices herein would embody within the light generating/emitting surfaces and/or in a configuration purposefully including portions of such surfaces with piezoelectric or comparable energy generating functionality.

Thus, whether contained within an opaque, semi opaque or transparent surface and/or component of the display, the variation from the uninfluenced position of said (piezoelectric compatible) materials to the altered position resulting from applied stress, from wind pressure for example, the emission of the light related to the media and the active materials in the energy generating should ideally be occurring substantially within the same planar surface related to the flat surface of the electronic, video "screens." Though, this not need be the case, as long as the light emitting and energy generating functions occur within the same overall apparatus and system, with consideration in design for accommodating both. In the preferred configuration, substantially most or all of the energy needed to emit the light for the display function of the system, should be and/or have been generated by the energy generating functions.

In still further configuration options, technology capable of generating energy from temperature differentials, whether as a stimulus for the material influences/forces causing the piezoelectric energy may be included in the system functionality. Forces resulting from material influences occurring from hot to cold, or vice versa, be it from familiar night/day temperature changes or other causes, may provide substantial enough influence to materials/aspects designed to harvest energy resulting from such changing influences, to be collected and used and/or stored.

Further, the present system may allow for the very screens occurring to display media as emitted light, at least, to simultaneously and/or at distinct times, collect solar energy. Whether sharing the actual surface portions exposed to the sun, or sharing adjacent and/or overlapping surfaces, (whether on one plane or not,) the visual display unit may again provide seamless tandem function. Again, preferably the energy generating by day would not include the display of media, though this is not essentially the case. Either function may occur alone or in tandem at any time, selectively.

Further, the display system may have yet further functionality, beyond the display, interactive and energy generating functions disclosed thus far. Namely, a plurality of either may occur; the display including audio output for example, alone or in tandem with visual display media; the energy generating function may include a plurality of energy generating options, such as solar energy and piezoelectric energy generating . . . though these two are exemplary only of any plurality of energy generating/harvesting system aspects sharing at least aspects of the hybrid display apparatus. Further, more than one energy generating operability may further allow for computer determined commands, preferably based on data from at least conditions affecting the display surface(s,) to generate/harvest any one or any selected plurality of energy types: Solar, piezoelectric, wind, electronic signal harvesting, etc.

Interactively, the system may include a plurality of interactive functions, such as system sampling of signals and/or other viewer related information in relation to at least computer decisions related to media displayed.

In one aspect, the present innovation is a system, method and apparatus for generating energy from external influences from the environment occurring around a substantially flat surface, with the same surface being at least involved (simultaneously or not) in returning all or part of that energy as specifically determined and configured light, by way of a computer operable electronic display function. Thus, external influence to electricity (namely the energy generated and/or harvested) followed by electricity to external influence, namely the video light emitted to the environment.

Piezoelectricity, as used herein, refers to the ability of some materials (notably crystals and certain ceramics, including bone) to generate an electric field or electric potential[1] in response to applied mechanical stress. The effect is closely related to a change of polarization density within the material's volume. If the material is not short-circuited, the applied stress induces a voltage across the material.

The piezoelectric effect is reversible in that materials exhibiting the direct piezoelectric effect (the production of an electric potential when stress is applied) also exhibit the reverse piezoelectric effect (the production of stress and/or strain when an electric field is applied). For example, lead zirconate titanate crystals will exhibit a maximum shape change of about 0.1% of the original dimension.

The effect finds useful applications such as the production and detection of sound, generation of high voltages, electronic frequency generation, microbalances, and ultra fine focusing of optical assemblies. It is also the basis of a number of scientific instrumental techniques with atomic resolution, the scanning probe microscopies such as STM, AFM, MTA, SNOM, etc., and everyday uses such as acting as the ignition source for cigarette lighters and push-start propane barbecues.

Scientists are researching several new technologies, which can harness potential energy from the human body. One such technology would generate electricity from the human foot pressure on stairs and escalators. The same technology could also be used to gather ambient energy in high-traffic sidewalks and hallways. Researchers from The Facility Architects in London say that each foot produces eight watts of electricity every time a step is taken. With current abilities 30 percent (2.4 watts) of energy can be produced by walking. Energy of this type could be used to power low-energy applications such as lighting and safety equipment.

Small electrical devices are steadily getting smaller and more efficient. If the energy requirements of sensors, monitors and communications equipment are reduced far enough, they could be operated by intercepting the ambient electricity generated by radio and television microwaves. Wireless electricity is considered to be a form of free energy, limited only by its proximity to ambient electromagnetic sources. The Oak Ridge National Laboratory has performed research which indicates that the range of available ambient power from this source could be microwatts to hundreds of milliwatts, depending on distance and power of the transmitter.

Ambient energy has been harvested from alternative sources like geothermal, hydro and solar radiation since the beginning of human history. While these traditional ambient energy sources have excellent power generating capacity, there are limited in remote applications. Today's high-tech world increasingly demands flexible, mobile and efficient energy sources. Alternative ambient energies could potentially reduce our daily fuel energy requirements, while helping to slow the depletion of global energy resources.

Although the present invention has been described in relation to particular embodiments thereof, many other variations and modifications and other uses will become apparent to those skilled in the art.

What is claimed is:

1. A display device comprises:
  a plurality of substrates, the plurality of substrates positioned such that substrates do not overlap one another;
  at least one light emitting element supported by each substrate of the plurality of substrates and operable to selectively emit light related to an aspect of a desired image to be displayed on the display device;
  at least one communication device supported on each substrate of the plurality of substrates configured and operable to receive instruction data related to an aspect of light output of each light emitting element and further related to said desired image to be displayed on the display device;
  at least one power device provided on each substrate of the plurality of substrates and connected to at least the at least one light emitting element, wherein the power device provides electricity to at least in part power the at least one light emitting element to display at least said aspect of the desired image on the display device; and
  an image capture device positioned separate from the plurality of substrates and operable to at least generate updated image information related to an image to be displayed on the display device, the image capture device configured and operable to capture at least some light emitted by the light emitting elements and to generate image related information based on the captured light, wherein the updated image information is selectively affected by the image related information, the image capture device further configured and operable to transmit signals representing at least some of the image related information or the updated image information and wherein the instruction data is based at least in part on at least some of the updated image information or the image related information.

2. The display device of claim 1, wherein the substrates are flexible, include a semi-transparent sheath and further include an attachment element operable for attachment of the substrate to a surface.

3. The display device of claim 1, wherein the communication device is operable to at least receive the instruction data via at least one of a wired connection and a wireless connection.

4. The display device of claim 1, wherein the power device includes a transparent photovoltaic element supported by at least the substrate and configured to generate electricity.

5. The display device of claim 1, wherein the power device further comprises at least one power storage element to store electricity.

6. The display device of claim 1, wherein the power storage device includes a folio battery supported by the substrate and electrically connected to at least the light emitting element.

7. The display device of claim 1, further comprising a control device positioned separate from the substrates and in communication with at least the communication device and the image capture device, the control device configured and operable to provide the instruction data based at least in part on at least some of the updated image information or the image related information.

8. The display device of claim 1, wherein at least one substrate of the plurality of substrates is not in direct physical contact with another substrate.

9. The display device of claim 1, wherein at least one substrate of the plurality of substrates is positioned on a different plane relative to at least one other substrate of the plurality of substrates.

10. The display device of claim 9, wherein the updated image information is generated based on a comparison of at least some of the image related information to said desired image and further wherein the image capture device is operable to convey at least some of the updated image information to the control device or the communication device.

11. The display device of claim 7, further comprising:
  a plurality of light emitting elements;
  a plurality of communication devices; and
  a plurality of power devices, wherein the plurality of light emitting elements, the plurality of communication devices and plurality of power devices are divided into distinct groups including at least one light emitting element, one communication device and one power device such that each distinct group is operable to display a portion of at least the desired image;
wherein an identifier is assigned to each distinct group based on at least a position of the unique group relative to the at least one control device.

12. The display device of claim 11, wherein the control device transmits instruction data to each distinct group based on its unique identifier.

13. The display device of claim 11, wherein each distinct group has a unique address associated with at least one communications network, and wherein computing associated with the communication network is provided by the control device.

14. A display system comprising:
a display device;
the display device comprising:
a plurality of substrates, the plurality of substrates positioned such that substrates do not overlap one another;
a least one light emitting element supported by each substrate of the plurality of substrates and operable to selectively emit light;
a communication device supported on each substrate of the plurality of substrates and operable to receive instruction data related to an aspect of light output of the at least one light emitting element and further related to a desired image to be displayed on the display device;
a power device provided on each substrate of the plurality of substrates and operable to provide electricity provided to at least the at least one light emitting element, wherein the power device provides electricity to power the at least one light emitting element to display at least one aspect of the desired image on the display device;
a control device positioned separate from the substrates and in communication with the communication device, the control device operable to provide the instruction data; and
an image capture device positioned separate from the substrates and operable to provide at least updated image information regarding an image displayed on the image device the image capture device operable to capture at least some light emitted by the light emitting elements and to generate image related information based on the captured light, wherein the updated image information is selectively affected by the image related information and the image capture is further configured to convey the updated image information to at least the control device, wherein the instruction data is based at least on the updated image information.

15. The display system of claim 14, wherein the power device includes a power storage device.

16. The display system of claim 15, further comprising a plurality of display devices, each display device connected to the control device to receive unique instruction data related to a portion of the desired image.

17. The display system of claim 16, wherein the plurality of display devices are divided into distinct groups and each distinct group is assigned a unique address based on a relative position of the distinct group relative to the control device.

18. The display system of claim 17, wherein a distinct group includes a single display device.

19. The display system of claim 17, wherein the image capture device and the control device are aspects of and within the housing of a single computing and transmitting device.

* * * * *